United States Patent
Matsumoto

(10) Patent No.: US 10,126,430 B2
(45) Date of Patent: Nov. 13, 2018

(54) AUTOMATED DRIVING CONTROL APPARATUS AND AUTOMATED DRIVING CONTROL METHOD

(71) Applicant: DENSO CORPORATION, Kariya, Aichi-pref. (JP)

(72) Inventor: Masato Matsumoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/172,754

(22) Filed: Jun. 3, 2016

(65) Prior Publication Data

US 2016/0356623 A1 Dec. 8, 2016

(30) Foreign Application Priority Data

Jun. 5, 2015 (JP) .................. 2015-114901

(51) Int. Cl.
| | |
|---|---|
| G01C 21/36 | (2006.01) |
| G01S 19/42 | (2010.01) |
| G05D 1/00 | (2006.01) |
| G01C 21/34 | (2006.01) |
| B60W 30/00 | (2006.01) |
| G08G 1/00 | (2006.01) |

(52) U.S. Cl.
CPC ............. *G01S 19/42* (2013.01); *B60W 30/00* (2013.01); *G01C 21/3461* (2013.01); *G08G 1/00* (2013.01)

(58) Field of Classification Search
CPC .......... G01S 19/42; G08G 1/00; B60W 30/00; G01C 21/3461

See application file for complete search history.

(56) References Cited

U.S. PATENT DOCUMENTS

| | | | |
|---|---|---|---|
| 9,528,850 B1 * | 12/2016 | Hobbs | ................... G01C 21/34 |
| 2003/0088344 A1 | 5/2003 | Oda et al. | |
| 2013/0073122 A1 | 3/2013 | Hoshiya | |
| 2016/0305787 A1 * | 10/2016 | Sato | .................... G05D 1/0088 |

(Continued)

FOREIGN PATENT DOCUMENTS

| | | |
|---|---|---|
| JP | 2004-126888 | 4/2004 |
| JP | 2009-042106 A | 2/2009 |

(Continued)

*Primary Examiner* — Anne M Antonucci
(74) *Attorney, Agent, or Firm* — Knobbe, Martens, Olson & Bear, LLP

(57) ABSTRACT

In an automated driving control apparatus, an information acquirer is configured to acquire driving control information needed to control automated driving of a vehicle. A degradation information storage is configured to store information about accuracy degraded roads that are roads on which the accuracy of the driving control information is degraded to below a predetermined required level. An information updater is configured to acquire observed information concerning the information acquirer, and using the observed information, update stored contents of the degradation information storage. A route generator is configured to generate a route excluding the accuracy degraded roads stored in the degradation information storage. A driving controller is configured to conduct automated driving control of the vehicle according to the route generated by the route generator and the driving control information acquired by the information acquirer.

14 Claims, 18 Drawing Sheets

(56) References Cited

U.S. PATENT DOCUMENTS

2018/0023966 A1    1/2018   Iwai et al.
2018/0038701 A1    2/2018   Iwai et al.

FOREIGN PATENT DOCUMENTS

| JP | 2011-118603 | | 6/2011 |
| JP | 2011-232271 | | 11/2011 |
| JP | 2011-257234 | A | 12/2011 |
| WO | WO 2014/139821 | * | 9/2014 |

\* cited by examiner

FIG.3A

IN THE PRESENCE OF ALTERNATIVE ROUTE

IMPASSABLE ROAD HAS BEEN DETECTED. CONTINUATION OF AUTOMATED DRIVING WILL MAKE A DELAY OF ABOUT XX MINUTES.

NEXT

WOULD YOU LIKE TO CONTINUE AUTOMATED DRIVING? ARRIVAL DELAY: ABOUT XX MINUTES

YES
CONTINUE
AUTOMATED DRIVING

NO
SWITCH TO
MANUAL DRIVING

FIG.3B

IN THE ABSENCE OF ALTERNATIVE ROUTE

IMPASSABLE ROAD HAS BEEN DETECTED. THERE IS NO ROUTE TO CONTINUE AUTOMATED DRIVING.

NEXT

WOULD YOU LIKE TO CONTINUE AUTOMATED DRIVING? IF CONTINUED, BRIEF STOP WILL BE MADE.

YES
CONTINUE
AUTOMATED DRIVING

NO
SWITCH TO
MANUAL DRIVING

FIG.4

[DEGRADATION INFORMATION TABLE]

| ROAD IDENTIFIER RID | ACCURACY DEGRADATION FLAG F | FIRST NUMBER OF VEHICLES Ncar | SECOND NUMBER OF VEHICLES Ninf |
|---|---|---|---|
| 1 | OFF | ... | ... |
| 2 | OFF | ... | ... |
| 3 | ON | ... | ... |
| 4 | OFF | ... | ... |
| 5 | ... | ... | ... |
| ... | ... | ... | ... |

FIG.6

[OBSERVATION INFORMATION TABLE]

| |
|---|
| SEGMENT N-13 |
| SEGMENT N-12 |
| SEGMENT N-11 |
| SEGMENT N-10 |
| SEGMENT N-9 |
| SEGMENT N-8 |
| SEGMENT N-7 |
| SEGMENT N-6 |
| SEGMENT N-5 |
| SEGMENT N-4 |
| SEGMENT N-3 |
| SEGMENT N-2 |
| SEGMENT N-1 |

} UNIT ROAD N

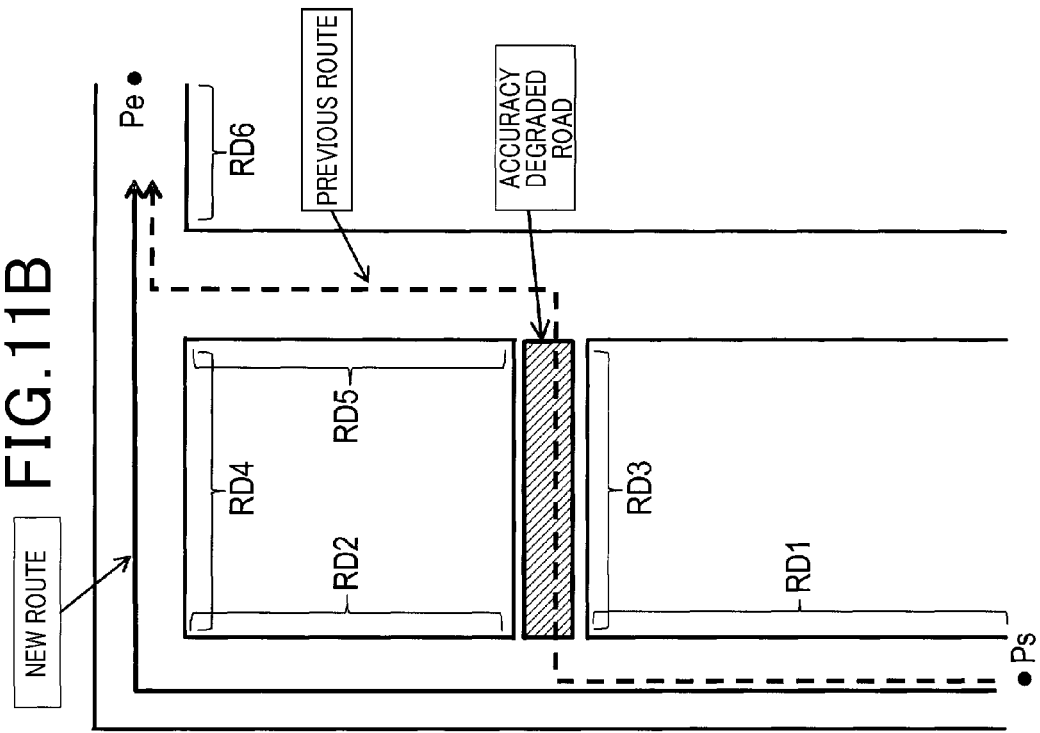
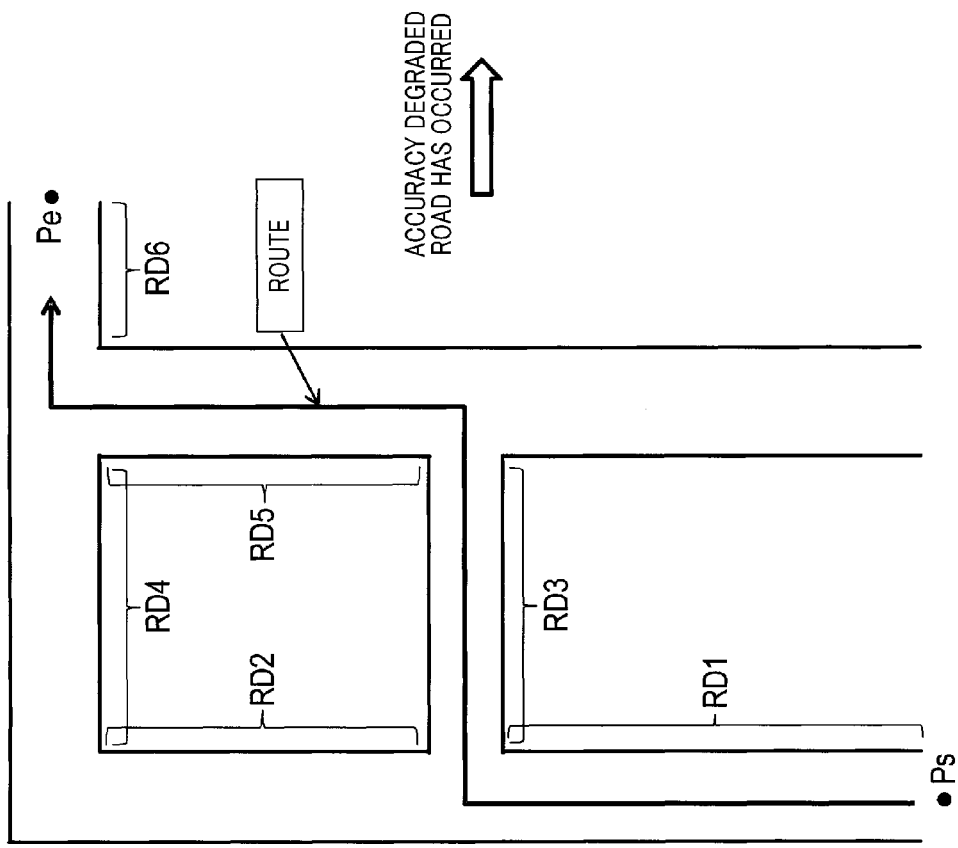

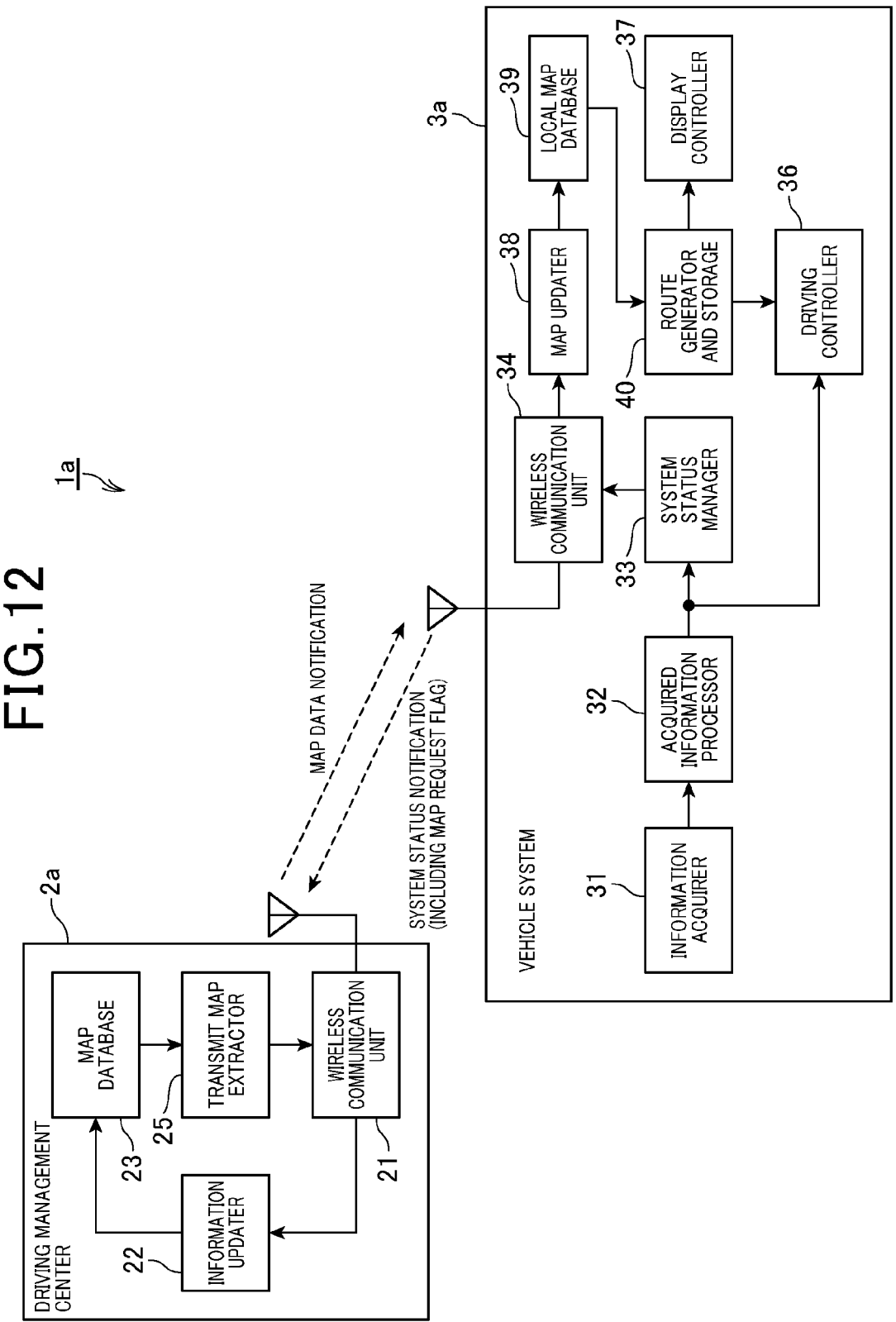

FIG.15

[DEGRADATION INFORMATION TABLE]

| ROAD IDENTIFIER RID | SENSOR LEVEL LV | TIME-SLOT TW | ACCURACY DEGRADATION FLAG F |
|---|---|---|---|
| 1 | 3 | 0:00-1:00 | OFF |
| 1 | 3 | ... | OFF |
| 1 | 3 | 23:00-24:00 | OFF |
| 1 | 2 | 0:00-1:00 | OFF |
| 1 | 2 | ... | OFF |
| 1 | 2 | 16:00-17:00 | ON |
| 1 | 2 | ... | OFF |
| 1 | 2 | 23:00-24:00 | OFF |
| 1 | 1 | 0:00-1:00 | ON |
| 1 | 1 | ... | ON |
| 1 | 1 | 23:00-24:00 | ON |
| 2 | ... | ... | ... |

FIG.16

[VEHICLE INFORMATION TABLE]

| VEHICLE ID | SENSOR LEVELS | | |
|---|---|---|---|
| | GNSS | CAMERA | Lidar |
| 0001 | 3 | 3 | 3 |
| 0002 | 3 | 3 | 2 |
| 0003 | 3 | 2 | 2 |
| 0004 | 2 | 3 | 1 |
| 0005 | ... | ... | ... |
| ... | ... | ... | ... |

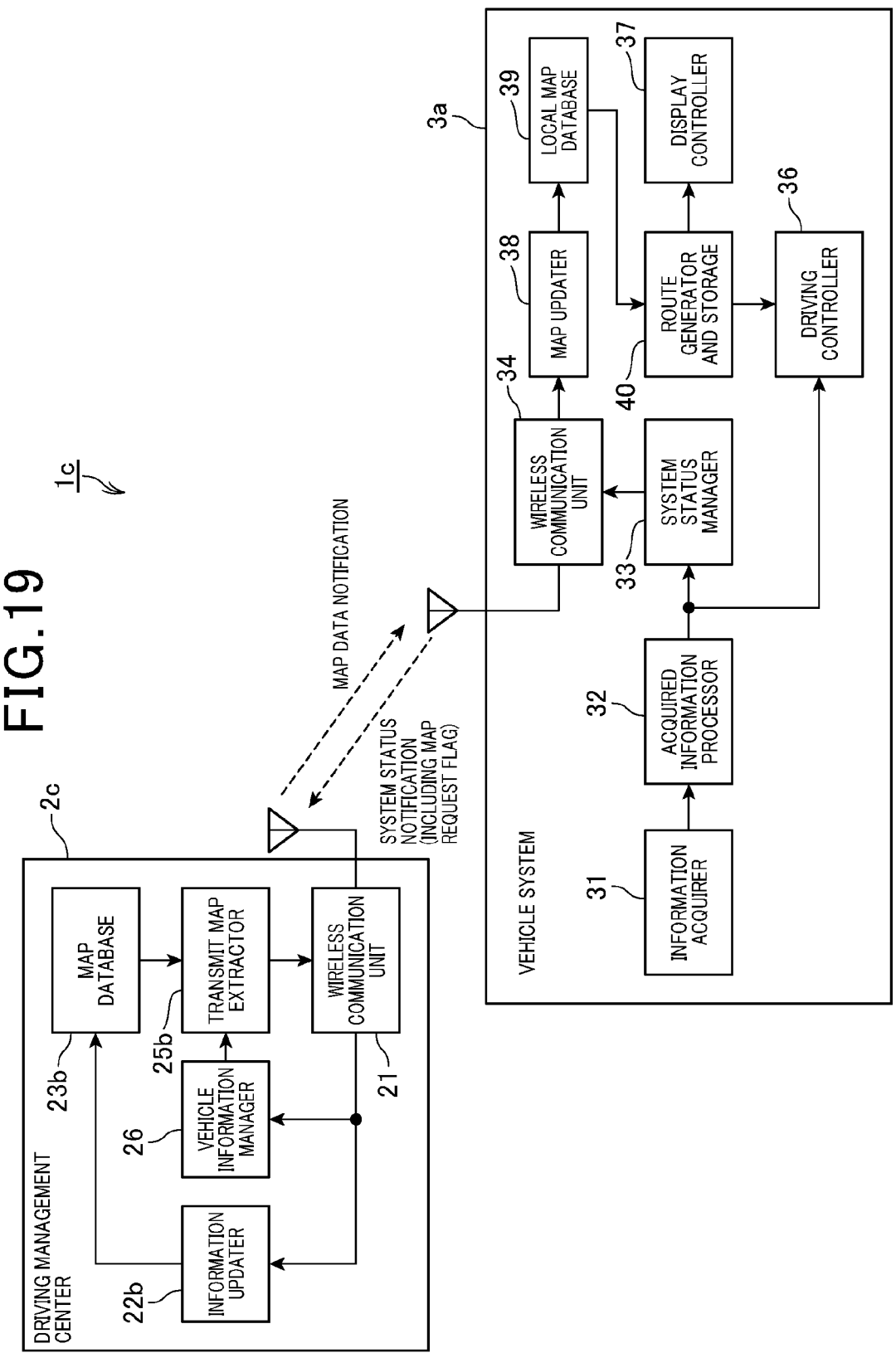

AUTOMATED DRIVING CONTROL APPARATUS AND AUTOMATED DRIVING CONTROL METHOD

CROSS-REFERENCE TO RELATED APPLICATION

This application is based on and claims the benefit of priority from earlier Japanese Patent Application No. 2015-114901 filed Jun. 5, 2015, the descriptions of which are incorporated herein by reference.

BACKGROUND

Technical Field

The present invention relates to techniques for automated driving of a vehicle.

Related Art

Conventionally, techniques are known for automated driving of vehicles using a satellite positioning system. As one of such techniques, a technique disclosed in Japanese Patent Application Laid-Open Publication No. 2009-42106 is configured to acquire information about a constellation of global positioning system (GPS) satellites, produce a satellite blockage area map indicative of areas where the GPS satellites are blocked by surrounding structures, and use the satellite blockage area map to select, as a route to a destination for an own vehicle, one of route candidates, along which the GPS satellites are assumed to be best acquirable.

However, the conventional satellite blockage area map is estimated from situations of known surrounding structures. This may give rise to a problem that the satellite blockage area map does not necessarily coincide with observations due to the presence of roadside trees and/or temporarily placed structures that were not taken into account in the satellite blockage area map.

In addition, automated driving utilizes not only information from the satellite positioning system, but also information from various vehicle-mounted sensors, such as a camera, a radar and the like. This may give rise to another problem that robustness may be lost if the accuracy of at least one of the vehicle-mounted sensors (including a satellite positioning system receiver) is degraded.

Further, for example, the accuracy in detecting white lines using the camera may vary depending on reflectional conditions of road surfaces. Thus, the degradation of the information acquired from the vehicle-mounted sensors may be caused by such complicated conditions and may occur in near real time, which cannot be known in advance.

In consideration of the foregoing, exemplary embodiments of the present invention are directed to providing techniques for generating a route for automated driving of a vehicle, regardless of situations.

SUMMARY

In accordance with an exemplary embodiment of the present invention, there is provided an automated driving control apparatus. In the apparatus, an information acquirer is configured to acquire driving control information needed to control automated driving of a vehicle. A degradation information storage is configured to store information about accuracy degraded roads that are roads on which the accuracy of the driving control information is degraded to below a predetermined required level. An information updater is configured to acquire observed information concerning the information acquirer, and using the observed information, update stored contents of the degradation information storage. A route generator is configured to generate a route excluding the accuracy degraded roads stored in the degradation information storage. A driving controller is configured to conduct automated driving control of the vehicle according to the route generated by the route generator and the driving control information acquired by the information acquirer.

The degradation information storage, the information updater and the route generator may form a driving management center configured to manage automated driving of the vehicle within a predefined area. The information acquirer and the driving controller may form an apparatus for automated driving mounted in the vehicle, the vehicle-mounted apparatus for automated driving may be configured to communicate with the driving management center and thereby acquire the route generated by the route generator.

Alternatively, the degradation information storage and the information updater may form a driving management center configured to manage automated driving of the vehicle within a predefined area. The information acquirer, the route generator, and the driving controller may form an apparatus for automated driving mounted in the vehicle. The vehicle-mounted apparatus for automated driving may be configured to communicate with the driving management center and thereby acquire the information about the accuracy degraded roads stored in the degradation information storage.

With such configurations, automated driving control can be conducted according to a route excluding the accuracy degraded roads. The accuracy degraded roads may be updated in response to the observed information from the information acquirer, which may allow automated driving control to reflect actual situations. This allows a route suitable for automated driving to be properly generated.

In accordance with another exemplary embodiment of the present invention, there is provided an apparatus for automated driving mounted in a vehicle, In the apparatus, an information acquirer is configured to acquire driving control information needed to control automated driving of the vehicle. A degradation information acquirer is configured to acquire information about accuracy degraded roads that are roads on which the accuracy of the driving control information is degraded to below a predetermined required level. A route generator is configured to generate a route excluding the accuracy degraded roads indicated by the information acquired by the degradation information acquirer. A driving controller is configured to conduct automated driving control of the vehicle according to the route generated by the route generator and the driving control information acquired by the information acquirer.

With such a configuration, similar advantages to those of the apparatus of the above embodiment can be provided.

In accordance with still another exemplary embodiment of the present invention, there is provided an automated driving control method including first to fourth steps. These steps correspond to operations of the information acquirer, the information updater, the route generator, and the driving controller, respectively. Also with such an automated driving control method, similar advantages to those of each apparatus defined as above can be provided.

BRIEF DESCRIPTION OF THE DRAWINGS

FIG. 3A is an example of a screen display for confirming a driver's intent in the case that an impassable road has been detected;

FIG. 3B is an example of a screen display for confirming a driver's intent in the case that there is an alternative route suitable for automated driving;

FIG. 4 is an example of a degradation information table stored in a map database;

FIG. 6 is an example of an observed information table for each unit road;

FIG. 11A is an example of a display screen before a route change;

FIG. 11B is an example of a display screen after the route change;

FIG. 12 is a block diagram of an automated driving control system in accordance with a second embodiment;

FIG. 15 is an example of a degradation information table stored in a map database of the third embodiment;

FIG. 16 is an example of a vehicle information table stored in a vehicle information manager of the third embodiment;

FIG. 19 is a block diagram of an automated driving control system in accordance with a fourth embodiment.

DESCRIPTION OF SPECIFIC EMBODIMENTS

Figure 1:
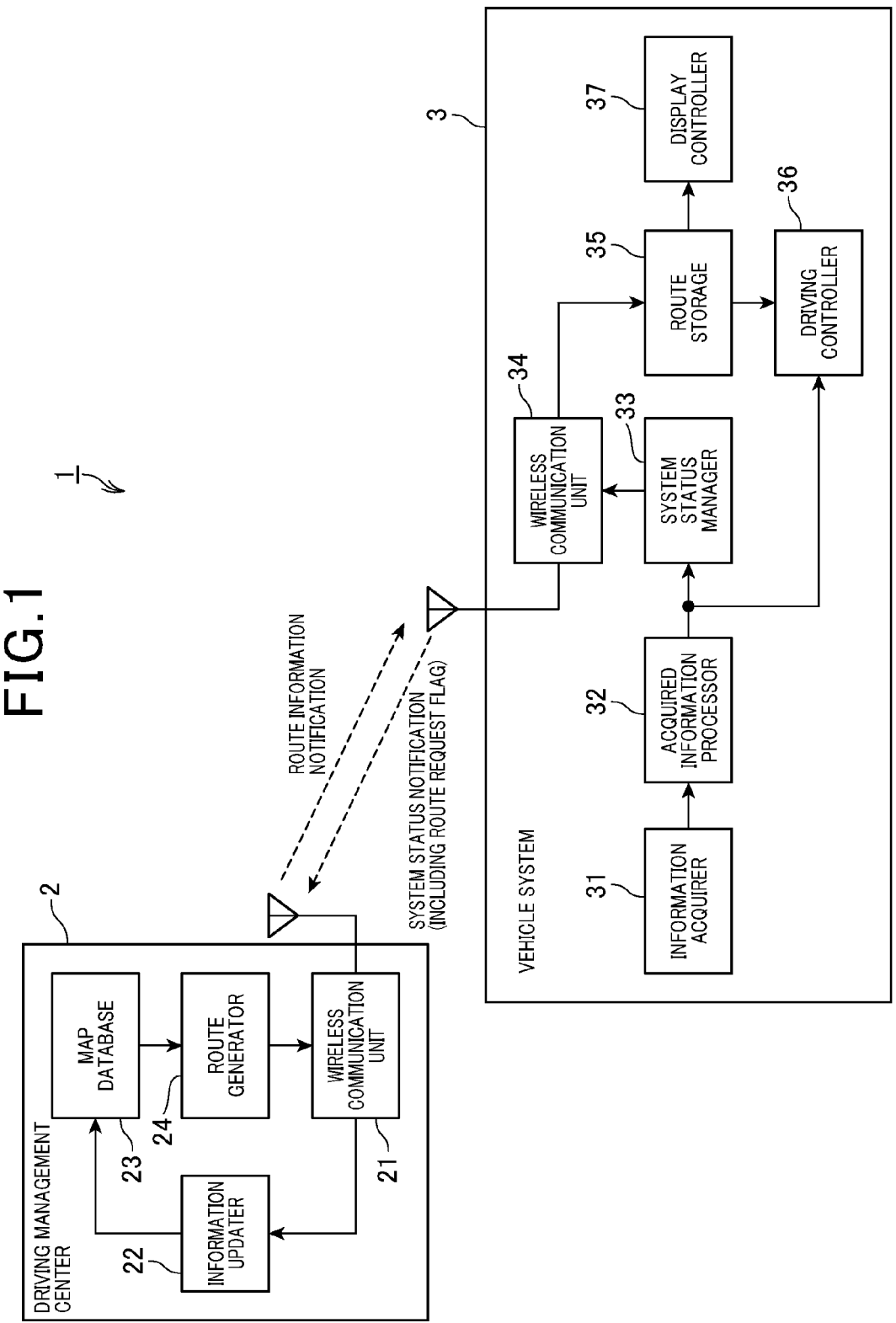
FIG. 1 is a block diagram of an automated driving control system in accordance with a first embodiment.

Example embodiments will now be described more fully with reference to the accompanying drawings. Example embodiments are provided so that this disclosure will be thorough, and will fully convey the scope to those who are skilled in the art. Numerous specific details are set forth such as examples of specific components to provide a thorough understanding of embodiments of the present disclosure. It will be apparent to those skilled in the art that example embodiments may be embodied in many different forms and that neither should be construed to limit the scope of the disclosure. Identical or equivalent components or components of equal or equivalent action are thereby identified by the same or similar reference numerals.

1. First Embodiment (1.1. Overall Configuration)

An automated driving control system 1 (as an automated driving control apparatus), as shown in FIG. 1, includes a driving management center 2 and a vehicle system 3. The driving management center 2 and the vehicle system 3 wirelessly communicate with each other. The vehicle system 3 transmits to the driving management center 2 a system status notification to notify the driving management center 2 of a status of the vehicle system 3. The driving management center 2 transmits to the vehicle system 3 a route information notification to be used for automated driving. With such a configuration, the driving management center 2 can identify roads in environments suitable for automated driving and set a route. The vehicle system 3 can perform automated driving control along the route acquired from the driving management center 2.

In the following descriptions, the term "unit road" refers to an actual road corresponding to a link included in a connected set of links and nodes that form map data. The set of links and nodes are defined such that any two nodes are connected by one of the links, where each node represents a point on the map. The term "route" represents a set of unit roads connecting a starting point and a destination.

(1.2. Vehicle System)

The vehicle system 3 is mounted in an automated driving enabled vehicle and includes an information acquirer 31, an acquired information processor 32, a system status manager 33, a wireless communication unit 34, a route storage 35, a driving controller 36, and a display controller 37. The vehicle carrying the vehicle system is hereinafter referred to as an own vehicle.

The information acquirer 31 includes various devices or sensors to acquire a variety of information needed to perform automated driving control, such as behaviors of the own vehicle, ambient surroundings of the own vehicle and the like. More specifically, the information acquirer 31 may include a camera to capture at least images of a road surface forward of the own vehicle, a satellite receiver to receive signals from quasi-zenith satellites and global positioning system (GPS) satellites and others forming global navigation satellite systems (GNSS), and a radar sensor (e.g., a millimeter wave sensor, Lidar, a sound wave sensor) to detect targets around the own vehicle.

The acquired information processor 32 is configured to extract available information from the information acquired at the information acquirer 31. For example, the acquired information processor 32 is configured to process image data from the camera to detect white lines and the like drawn on the road surface, and further calculate lateral distances from the own vehicle to the respective white lines, generate location information indicative of a current location (latitude, longitude, altitude and the like) of the own vehicle based on the received signals from the satellite receiver, and process information about targets located around the own vehicle. The information generated at the acquired information processor 32 includes a location detection flag indicative of whether or not a valid output has been acquired from the satellite receiver and a white line detection flag indicative of whether or not white lines have been detected from the image data. The information acquired at the acquired information processor 32 will hereinafter be referred to as driving control information.

The system status manager 33 is configured to manage, as system status information, the information generated at the acquired information processor 32, modes of operation of the vehicle system 3, and instruction information indicative of instructions from the driver and a vehicle-mounted system. The modes of operation include at least automated driving mode. The instruction information includes at least a route request flag indicative of whether to request a set-up of the route to be used for automated driving and a destination for automated driving.

The wireless communication unit 34 is configured to establish wireless communications with the driving management center 2 to exchange a variety of information. More specifically, the wireless communication unit 34 is configured to transmit, to the driving management center 2, a system status notification carrying the system status information managed by the system status manager 33 and a vehicle identifier (ID) to identify a source every predetermined time interval (e.g., 100 ms). The wireless communication unit 34 is configured to receive, from the driving management center 2, a route information notification carrying route information about the route to be used for automated driving. One of wireless fidelity (Wi-Fi), long term evolution (LTE), 3rd generation mobile communications system (3G), vehicle to X (V2X) and the like may be used as a communication scheme for the wireless communications.

The route storage 35 is configured to store the route indicated by the route information notification received at the wireless communication unit 34. This route store processing will be described later in detail.

The driving controller 36 is configured to generate a command to drive the own vehicle along the route stored in the route storage 35 and distribute the command to various controllers throughout the own vehicle. This command allows acceleration, deceleration, steering and the like of the own vehicle to be controlled.

The display controller 37 is configured to display, on a display screen placed visible to the driver of the own vehicle, a road map around a current location of the own vehicle. The route and accuracy degraded roads that are unusable for automated driving are shown on the road map. The display controller 37 is further configured to display, on the display screen, input icons used to confirm the intention of the driver and receive inputs via the input icons. Additionally, the display controller 37 may be used to notify the driver of a variety of information.

Each of the acquired information processor 32, the system status manager 33, the route storage 35, the driving controller 36, and the display controller 37 may be a well-known microcomputer including a central processing unit (CPU), a read-only memory (ROM), a random-access memory (RAM), and other components. The functions of each of them may be implemented by the CPU executing computer programs stored in the ROM or the like.

(1.2.1. Route Store Processing)

Figure 2:
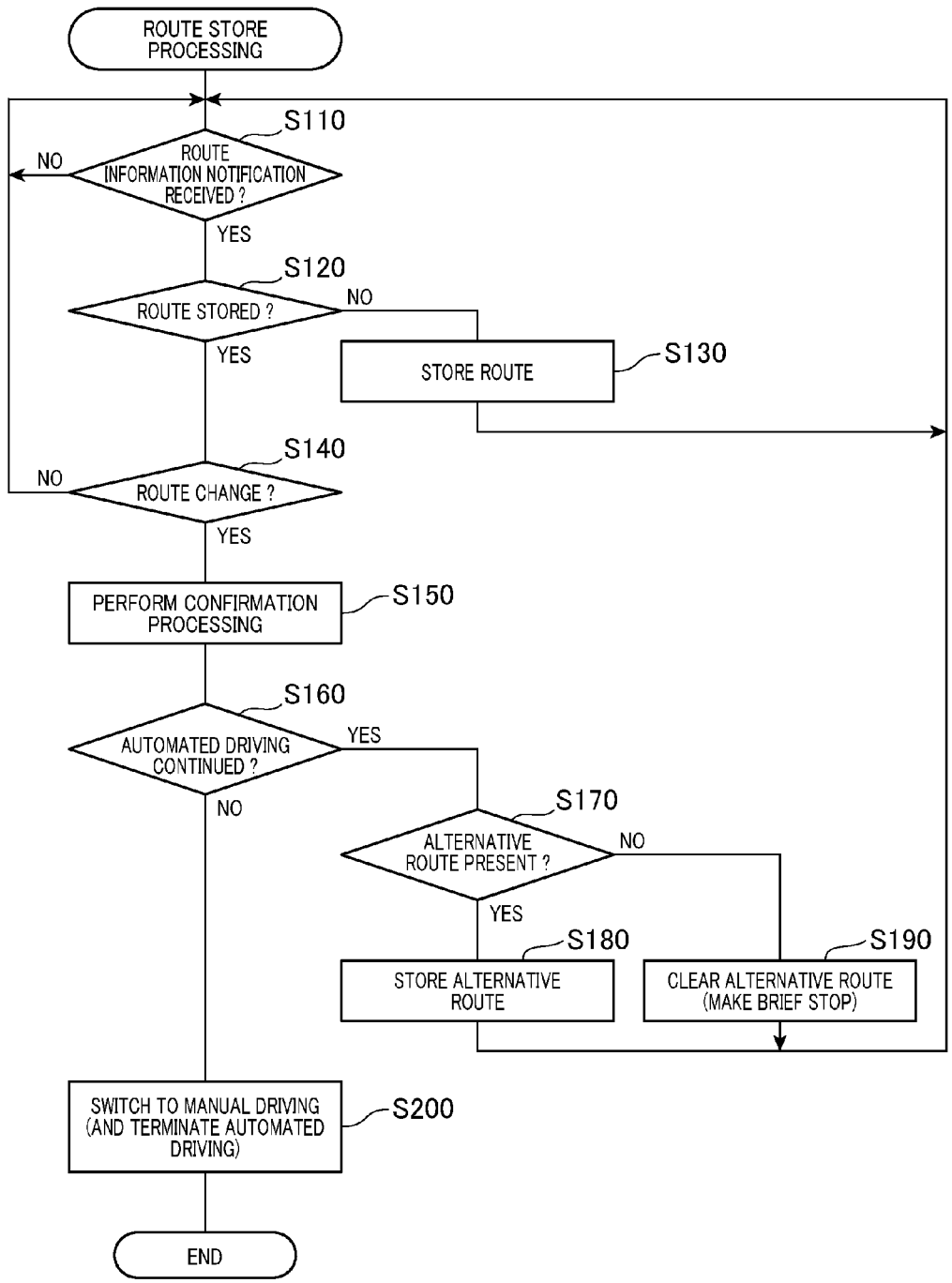
FIG. 2 is a flowchart of route store processing to be performed in a vehicle system.

The route store processing to be performed in the route storage 35 will now be described with reference to a flowchart of FIG. 2. This processing is launched upon driver's entry of an instruction via a given input device (not shown) to start automated driving. Where the wireless communication unit 34 transmits to the driving management center 2 the system status notification including the route request flag set ON and additional information about a destination of automated driving entered via the input device.

First, in step S110, the route storage 35 determines whether or not the wireless communication unit 34 has received the route information notification from the driving management center 2. If it is determined that the wireless communication unit 34 has not yet received any route information notification, step S110 is repeated. The route storage 35 thereby waits for receipt of the route information notification. If it is determined that the wireless communication unit 34 has received the route information notification, then the process flow proceeds to step S120.

In step S120, the route storage 35 determines whether or not the route to be used for automated driving is already stored. If it is determined that the route to be used for automated driving is already stored, then the process flow proceeds to step S140. If it is determined that no route to be used for automated driving is stored, then in step S130 the route storage 35 stores in a predefined area of the RAM the route indicated by the route information notification. Thereafter, the process flow returns to step S110.

In step S140, the route storage 35 determines whether or not the route indicated by the route information notification and the last stored route are different, that is, whether or not a route change has been made. If it is determined that a route change has been made, then the process flow proceeds to step S150. If it is determined that no route change has been made, then the process flow returns to step S110. In the present embodiment, also in the absence of the route indicated by the route information notification, it is determined that the route change has been made.

In step S150, the route storage 35 performs confirmation processing to confirm a driver's intent. More specifically, as shown in FIG. 3, the route storage 35 displays a status confirmation screen via the display controller 37 to prompt the driver to confirm the status. Upon detection of the operation of the driver that indicates that the status has been confirmed by the driver, the route storage 35 displays a selection menu via the display controller 37 to prompt the driver to select one of automated driving and manual driving. If the driver has selected one of automated driving and manual driving, then the process flow proceeds to step S160.

In the presence of an alternative route indicated by the route information notification, as shown in FIG. 3A, both of the status confirmation screen and the selection menu displays information about how much change in time is made to arrive the destination as compared to the original route if automated driving is continued. In the absence of an alternative route indicated by the route information notification, as shown in FIG. 3B, the status confirmation screen displays that there is no available alternative route for continuing automated driving. The selection menu then displays that if automated driving is continued a brief stop will be made until an available alternative route is presented.

Returning to FIG. 2, in step S160, the route storage 35 determines whether or not the driver has selected continuing automated driving in step S150. If in step S160 it is determined that the driver has selected continuing automated driving, then the process flow proceeds to step S170. If in step S160 it is determined that the driver has selected switching to manual driving, the process flow proceeds to step S200, where automated driving is terminated and then manual driving is started. Thereafter, the process flow ends.

In step S170, the route storage 35 determines whether or not there is an alternative route. In the presence of an alternative route, the route storage 35, in step S180, stores the alternative route in place of the route last stored. The process flow then returns to step S110. In the absence of an alternative route, the route storage 35, in step S190, clears the route stored in the RAM and then outputs an instruction to the driving controller 36 to make a brief stop of the own vehicle. The process flow then returns to step S110. Thereafter, upon receipt of the route information notification including a route, the route is stored in step S130. Thus, automated driving is restarted.

(1.3. Driving Management Center)

The driving management center 2 is configured to control automated driving of one or more vehicles in a particular area. As shown in FIG. 1, the driving management center 2 includes a wireless communication unit 21, an information updater 22, a map database (DB) 23, and a route generator 24.

The wireless communication unit 21 is configured to wirelessly communicate with the vehicle system 3, where the communication scheme supported by the wireless communication unit 21 for the wireless communications may be any one of Wi-Fi, LTE, 3G, V2X and the like.

The map database 23, as a degradation information storage, stores map data within a particular area served by the driving management center 2 and a degradation information table to be accessed upon generation of the route used for automated driving. As shown in FIG. 4, the degradation information table includes degradation information that associates each of unit road identifiers RID for identifying the respective unit roads located in the particular area with an accuracy degradation flag F indicative of whether or not the corresponding unit road is an accuracy degraded road. The accuracy degraded road is a unit road on which vehicle control information detected at the vehicle system 3 is degraded in accuracy. In the table, if the accuracy degradation flag F is ON, the unit road identified by the road identifier RID is unsuitable for automated driving. If the accuracy degradation flag F is OFF, the unit road identified by the road identifier RID is suitable for automated driving. The degradation information table includes fields for storing count values of a first number of vehicles Ncar and a second number of vehicles Ninf (both described later) are provided for each unit road identifier RID. The first and second numbers of vehicles Ncar and Ninf are used as information to update the corresponding accuracy degradation flag F.

The information updater 22 is configured to perform degradation determination information gathering processing to gather information needed to update the accuracy degradation flags F, that is, the first and second numbers of vehicles Ncar and Ninf, based on the system status information indicated by the system status notification received at the wireless communication unit 21 from the vehicle system 3, and perform accuracy degradation flag update processing to update the accuracy degradation flags F in response to the information gathered in the degradation determination information gathering processing. Not only the system status information acquired from the vehicle system 3, but also information from various sensors placed around or along roads or the like may be used in the degradation determination information gathering processing and the accuracy degradation flag update processing.

The route generator 24 is configured to perform route generation processing to generate a route in accordance with the map database 23 at a predefined generation timing and transmit the generated route to the vehicle system 3 via the wireless communication unit 21. In the route generation processing, the route may be generated upon receipt of the system status notification indicative the route request flag being ON from the vehicle system 3 via the wireless communication unit 21 or upon update of the degradation information table.

Each of the information updater 22 and the route generator 24 may be a well-known microcomputer including a central processing unit (CPU), a read-only memory (ROM), a random-access memory (RAM), and other components. The function of each of the information updater 22 and the route generator 24 may be implemented by the CPU executing computer programs stored in the ROM or the like. The degradation determination information gathering processing (described later) and the accuracy degradation flag update processing (described later) to be performed in the information updater 22 and the route generation processing (described later) to be performed in the route generator 24 are performed iteratively every predetermined time interval while the driving management center 2 is in operation.

(1.3.1. Degradation Determination Information Gathering Processing)

Figure 5:
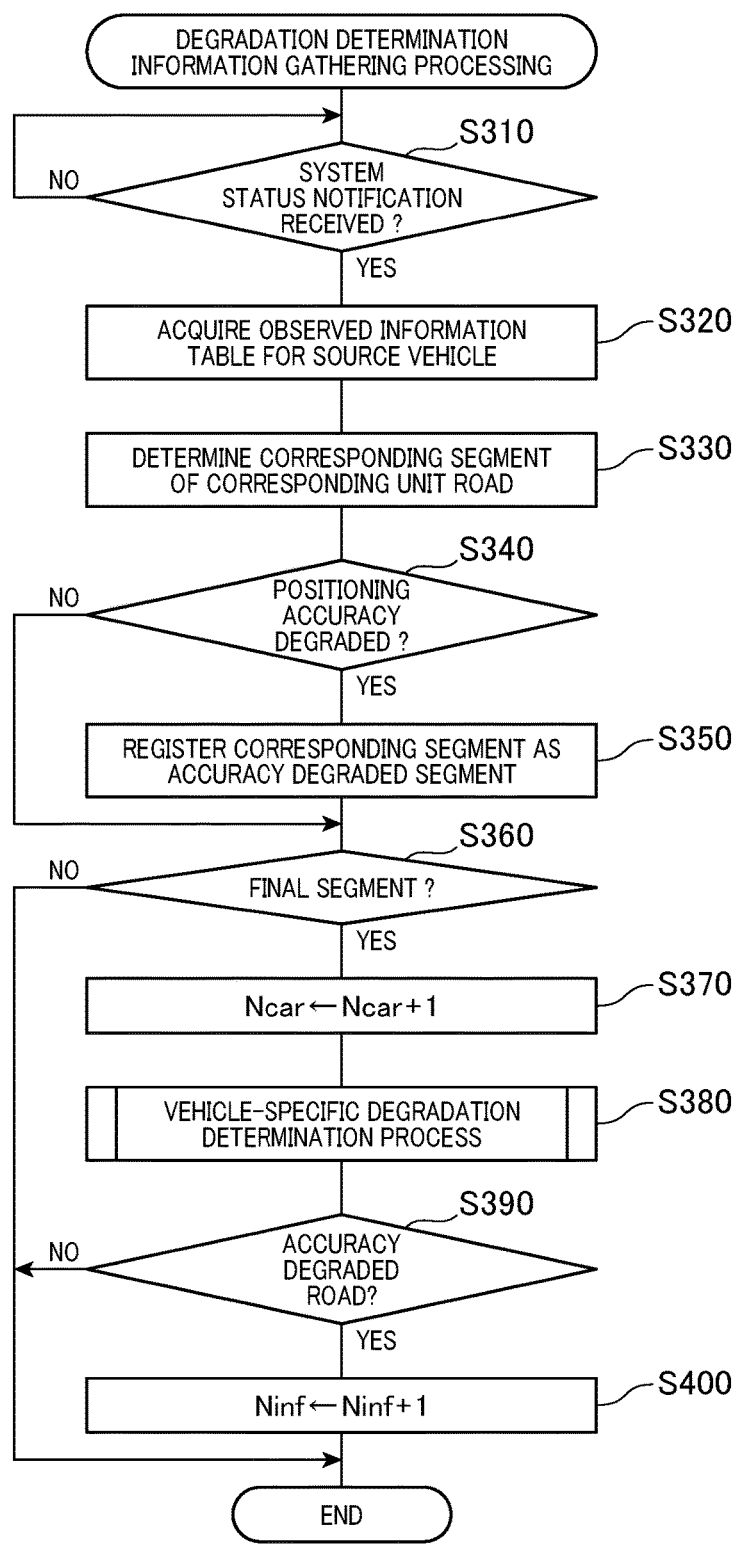
FIG. 5 is a flowchart of degradation determination information gathering processing to be performed in an information updater.

The degradation determination information gathering processing will now be described with reference to a flowchart of FIG. 5.

In step S310, the information updater 22 determines whether or not the wireless communication unit 21 has received the system status notification from the vehicle system 3. If the wireless communication unit 21 has not yet received the system status notification, the information updater 22 waits for the system status notification by repeating this step. If the wireless communication unit 21 has received the system status notification, the process flow proceeds to step S320.

In step S320, based on a vehicle ID of the source vehicle indicated by the system status notification, the information updater 22 acquires an observed information table associated with the vehicle ID. As shown in FIG. 6, the. observed information table stores determined accuracy of the driving control information for each of a plurality of segments of the unit road along which the source vehicle having the vehicle ID is traveling. In FIG. 6, the unit road identifier RID of the unit road along which the source vehicle is traveling is N. The unit road is divided into thirteen segments N-1 to N-13. Sizes of these segments may be variably set based on a predetermined standard speed and transmission cycles such that during the source vehicle traveling along the unit road at the standard speed the system status notifications associated with all the respective segments can be transmitted. Therefore, the segment size and the number of segments may differ between the unit roads. The standard speed may be an average speed of the vehicle traveling along the unit road.

In step S330, based on the location information indicated by the system status notification, the information updater 22 determines a corresponding unit road along which the source vehicle of the system status notification is traveling and a corresponding segment of the corresponding unit road.

In step S340, based on the location detection flag and the white line detection flag indicated by the system status notification, the information updater 22 determines whether or not the positioning accuracy is degraded. More specifically, if at least one of the location detection flag and the white line detection flag is OFF (which is indicative of the location information being undetectable or the white lines being undetectable), the information updater 22 determines that the positioning accuracy is degraded. If it is determined that the positioning accuracy is degraded, the process flow proceeds to step S350. Otherwise, the process flow skips step S350 and proceeds to step S360.

In step S350, the information updater 22 registers in the observed information table acquired in step S320 that the corresponding segment identified in step S330 is an accuracy degraded segment. In step S360, the information updater 22 determines whether or not the corresponding road segment is a final segment of the corresponding unit road. If the corresponding road segment is not the final segment of the corresponding unit road, the process flow ends. If the corresponding road segment is the final segment of the corresponding unit road, then in step S370 the information updater 22 increments the first number of vehicles Ncar for the unit road identifier RID of the corresponding unit road (Ncar←Ncar+1 or Ncar=Ncar+1).

In step S380, the information updater 22 performs vehicle-specific degradation determination processing using the observed information table for the source vehicle to determine whether or not the corresponding unit road is an accuracy degraded road.

Figure 7:
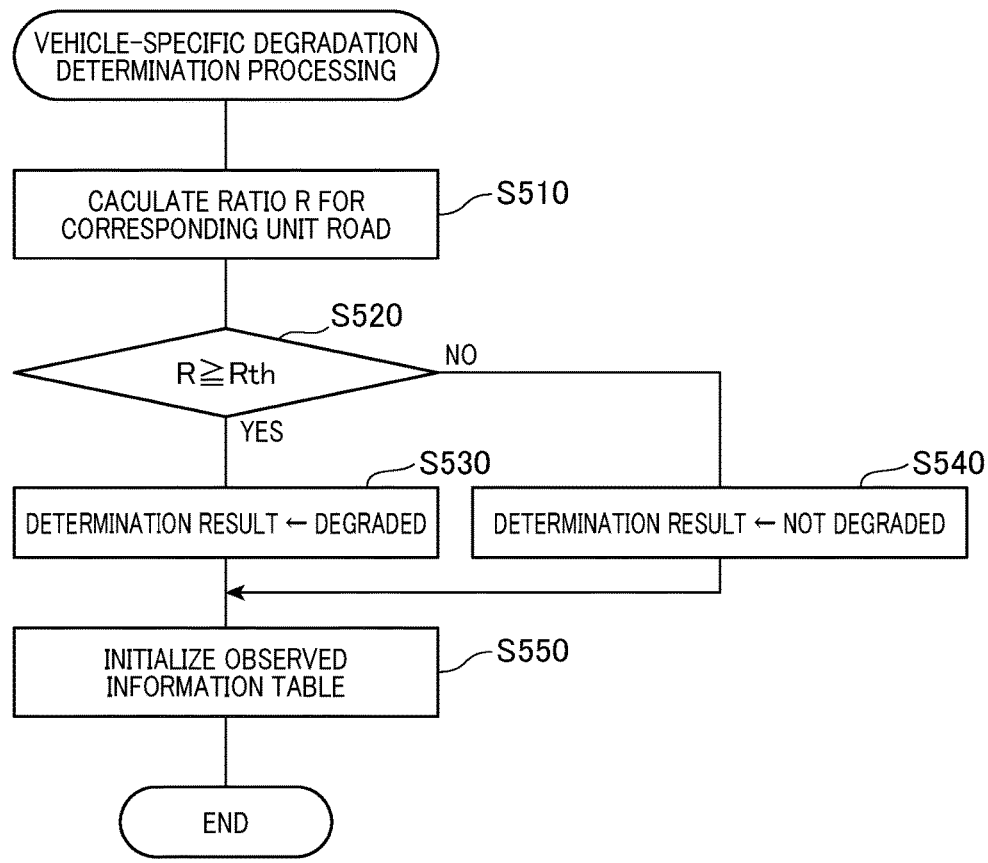
FIG. 7 is a flowchart of vehicle-specific degradation determination process to be performed in the degradation determination information gathering processing.

In the vehicle-specific degradation determination processing as shown in FIG. 7, in step S510, the information updater 22 looks up the observed information table of the source vehicle to calculate a ratio R of the number of segments of the corresponding unit road determined to be an accuracy degraded segment to the total number of segments of the corresponding unit road. Instead, the number of segments of the corresponding unit road determined to be an accuracy degraded segment may be simply counted, or if the segments of the corresponding unit road have different areas, a sum of areas of the segments determined to be an accuracy degraded segment may be calculated.

In step S520, the information updater 22 determines whether or not the ratio R is equal to or greater than a predetermined threshold Rth. If the ratio R is equal to or greater than the predetermined threshold Rth, then in step S530 the information updater 22 sets the determination result to "degraded". Then the process flow proceeds to step S550. If the ratio R is less than the predetermined threshold Rth, then in step S540 the information updater 22 sets the determination result to "not degraded". Then, the process flow proceeds to step S550.

In step S550, the information updater 22 initializes the observed information table for the source vehicle, and then process flow ends.

In the present embodiment, determination as to whether or not the corresponding unit road is an accuracy degraded road is made using the ratio R as defined above. Alternatively, if a maximum number of consecutive segments determined to be an accuracy degraded segment Nsuc is equal to or greater than a threshold Nth, it may be determined that the corresponding unit road is an accuracy degraded road. Still alternatively, if at least one of the ratio R and the number Nsuc is equal to greater than the threshold Rth or Nth, it may be determined that the corresponding unit road is an accuracy degraded road.

Returning to FIG. 5, in step S390, the information updater 22 determines whether or not the corresponding unit road is an accuracy degraded road. If it is determined that the corresponding unit road is not an accuracy degraded road, then process flow ends. If it is determined that the corresponding unit road is an accuracy degraded road, then process flow proceeds to step S400.

In step S400, for the unit road identifier RID for the corresponding unit road, the information updater 22 increments the second number of vehicles Ninf (where Nninf←Ninf+1 or Nninf=Ninf+1). Thereafter, the process flow ends.

The first number of vehicles Ncar is a number of vehicles carrying the vehicle system 3 that have passed through the unit road corresponding to the unit road identifier RID. The second number of vehicles Ninf is a number of vehicles that have passed through the corresponding unit road, in which vehicles the degradation in positioning accuracy has been detected during travel along the corresponding unit road.

(1.3.2. Accuracy Degradation Flag Update Processing)

Figure 8:
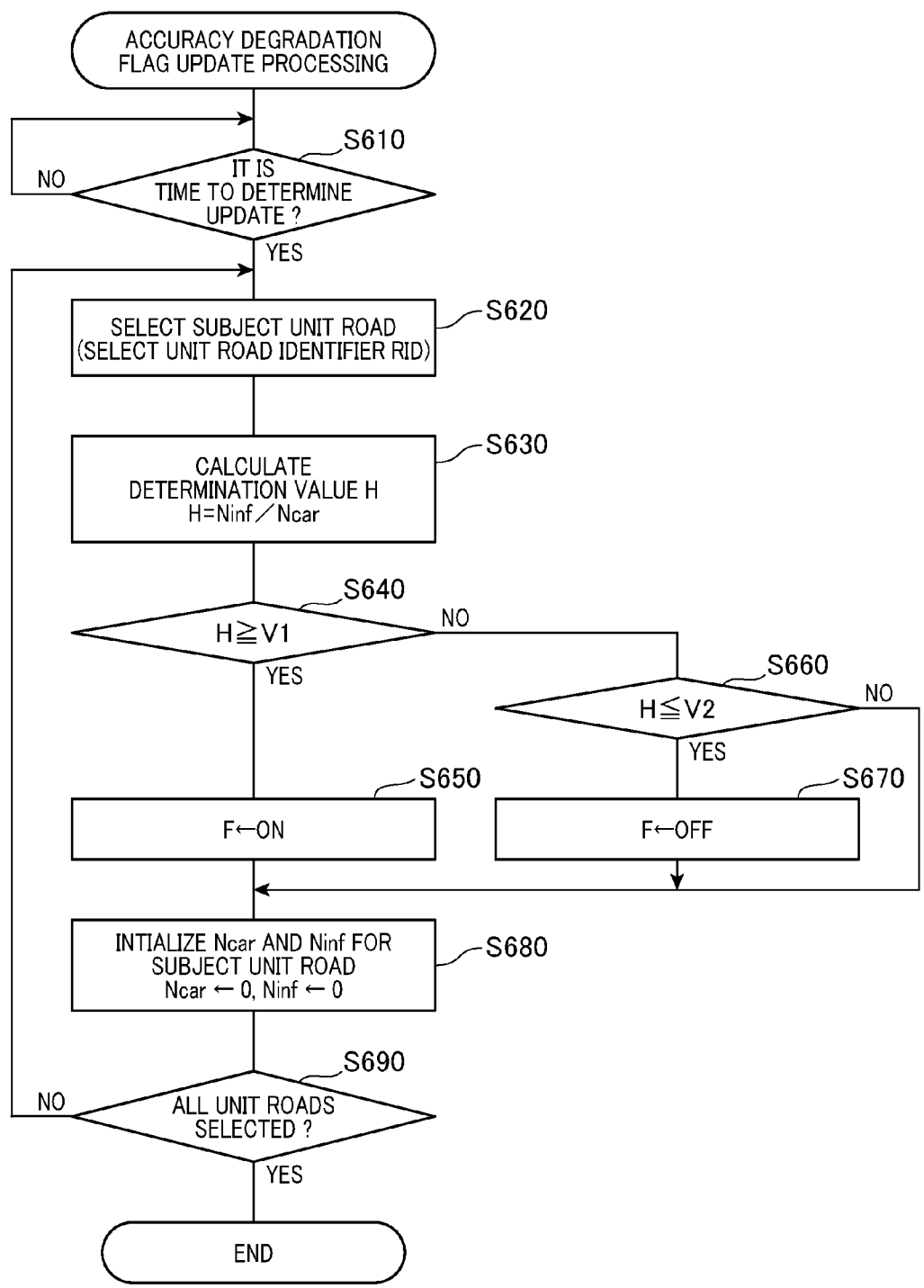
FIG. 8 is a flowchart of accuracy degradation flag update processing to be performed in the information updater.

The accuracy degradation flag update processing will now be described with reference to a flowchart of FIG. 8. Upon this processing being launched, the information updater 22, in step S610, determines whether or not it is time to determine to update the degradation information table of the map database 23. If it is not time to determine to update the degradation information table, the information updater 22 repeats step S610. Whether to update the degradation information table may be determined every predetermined interval. Alternatively, determination as to whether to update the degradation information table may be made each time a sum of the first numbers of vehicles Ncar in the degradation information table exceeds a predetermined threshold.

In step S620, the information updater 22 selects one of the unit road identifiers RIDs shown in the degradation information table of the map database 23. The unit road corresponding to the selected unit road identifier RID is referred to as a subject unit road.

In step S630, the information updater 22 looks up the degradation information table, and based on the first number of vehicles Ncar and the second number of vehicles Ninf for the subject unit road, calculate a determination value H according to the following equation (1).

$$H = Ninf/Ncar \quad (1)$$

In step S640, the information updater 22 determines whether or not the determination value H is equal to or greater than a predetermined degradation decision threshold V1. If the determination value H is less than the predetermined degradation decision threshold V1, then the process flow proceeds to step S660. If the determination value H is equal to or greater than the predetermined degradation decision threshold V1, then the process flow proceeds to step S650, where the information updater 22 sets ON the accuracy degradation flag F for the subject unit road indicated in degradation information table, which is followed by step S680. The accuracy degradation flag F set ON indicates that the subject unit road is an accuracy degraded road.

In step S660, the information updater 22 determines whether or not the determination value H is greater than a degradation-relieved threshold V2 that is set less than the predetermined degradation decision threshold V1. If the determination value H is greater than the degradation-relieved threshold V2, then the information updater 22 leaves the accuracy degradation flag F for the subject unit road unchanged. Then the process flow proceeds to step S680. If the determination value H is equal to or less than the degradation-relieved threshold V2, then the information updater 22 sets OFF the accuracy degradation flag F for the subject unit road. Then the process flow proceeds to step S680. The accuracy degradation flag F set OFF indicates that the subject unit road is not an accuracy degraded road.

In step S680, the information updater 22 initializes both the first number of vehicles Ncar and the second number of vehicles Ninf for the subject unit road to zero. In step S690, the information updater 22 determines whether or not the above steps S630-S680 have been performed for all the unit road identifiers RIDs shown in the degradation information table. If the above steps S630-S680 have not been performed for at least one of all the unit road identifiers RIDs shown in the degradation information table, the process flow returns to step S620. If the above steps S630-S680 have been performed for all the unit road identifiers RIDs, then the process flow ends.

(1.3.3. Route Generation Processing)

Figure 9:
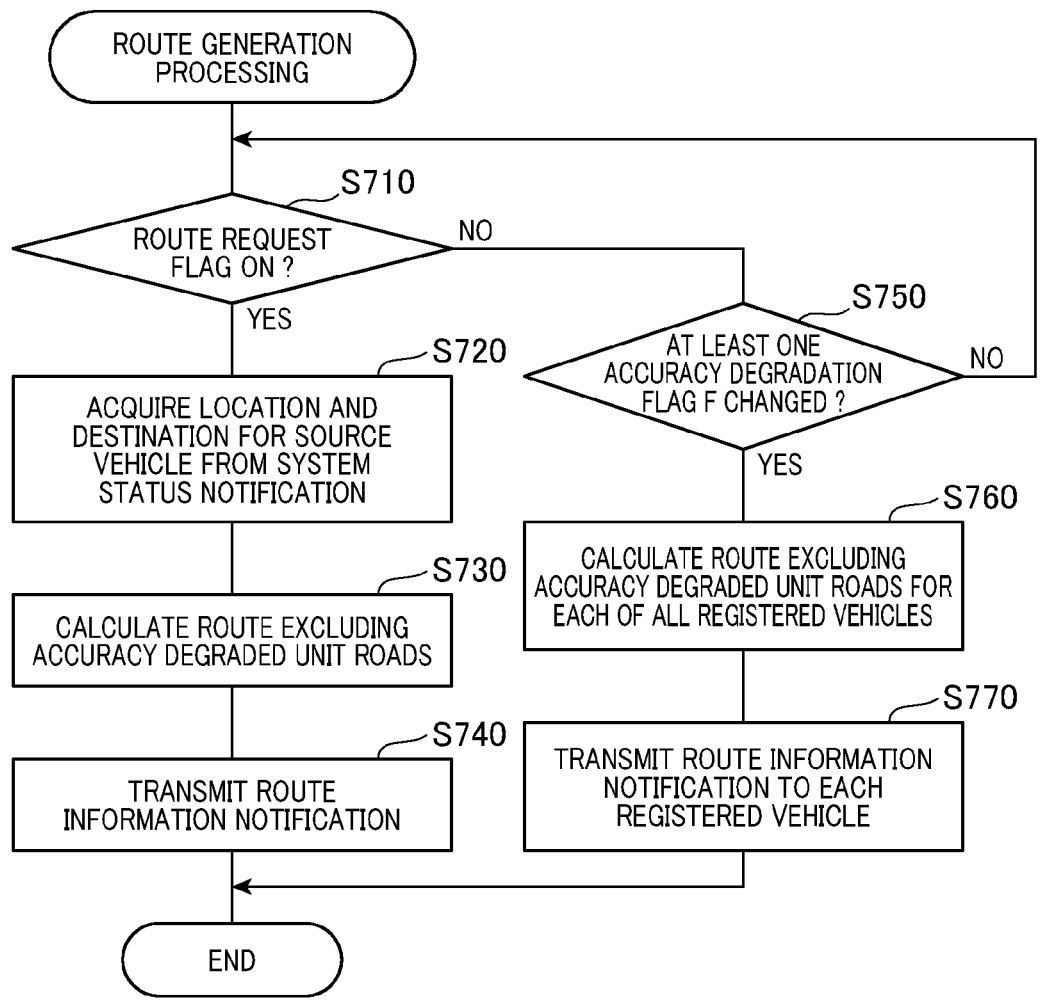
FIG. 9 is a flowchart of route generation processing to be performed in a route generator.

The route generation processing to be performed in the route generator 24 will now be described with reference to a flowchart of FIG. 9.

Upon this processing being launched, the route generator 24, in step S710, determines whether or not the system status notification including the route request flag set ON has been received from the vehicle system 3. If the system status notification including the route request flag set ON has been received from the vehicle system 3, the process flow proceeds to step S720. Otherwise, the process flow proceeds to step S750.

In step S720, the route generator 24 acquires location information and a destination for the source vehicle indicated by the system status notification.

In step S730, based on the information acquired in step S720 and the degradation information table of the map database 23, the route generator 24 calculates a route excluding accuracy degraded unit roads that are unit roads associated with the unit road identifiers RIDs for which the accuracy degradation flags F are ON. Calculation of such a route may be calculated in a well-known manner used in the navigation unit or the like, which will therefore not be described.

In step S740, the route generator 24 transmits a route information notification indicative of the route calculated in step S730 to the source vehicle and registers the source vehicle as a vehicle that is automatically traveling. Then the process flow ends. Information indicated by the route information notification may include not only the route calculated in step S730, but also information indicating that a route has failed to be set if the route setting is impossible and information about the accuracy degraded roads. The registered vehicle that is automatically travailing is de-registered upon receipt of a de-registration instruction from the registered vehicle or upon detection that the registered vehicle has arrived at the destination.

In step S750, the route generator 24 determines whether or not at least one accuracy degradation flag F in the degradation information table has changed. If none of the accuracy degradation flags F in the degradation information table have changed, the process flow returns to step S710. Otherwise, the process flow proceeds to step S760.

In step S760, the route generator 24 calculates, for each of all the registered vehicles that are automatically traveling (registered in step S740), a route excluding the accuracy degraded unit roads.

In step S770, the route generator 24 transmits, to each registered vehicle, the route information notification indicative of a processed result obtained in step S760 for the registered vehicle. Thereafter, the process flow ends.

(1.4. Operations)

Figure 10:
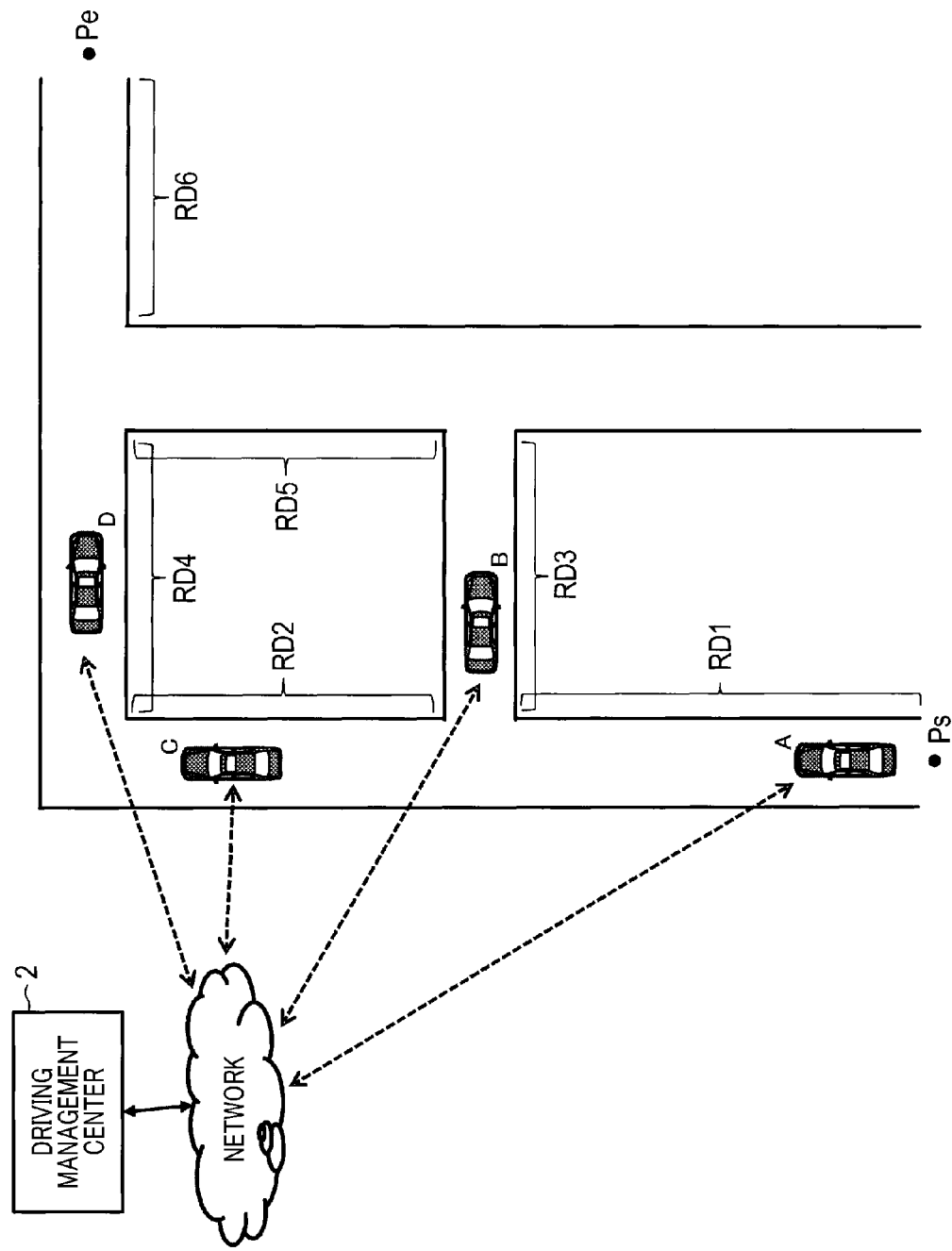
FIG. 10 is a schematic of a driving management center gathering observed information.

As shown in FIG. 10, the driving management center 2 regularly receives the system status notifications from the respective vehicles A-D via wireless communications with the vehicle systems 3 carried by the respective vehicles A-D traveling along unit roads in a given area. FIG. 10 shows the unit roads RD1-RD6 within the area. For example, the current location of the vehicle A is denoted by Ps and its destination is denoted by Pe. In the example of FIG. 10, the driving management center 2 will receive the observed information about the unit road RD1 from the vehicle A, the observed information about the unit road RD2 from the vehicle B, the observed information about the unit road RD3 from the vehicle C, and the observed information about the unit road RD4 from the vehicle D.

Upon transmission of the system status notification with the route setting flag set ON from the vehicle system 3 carried by the vehicle A located at the current location Ps, the driving management center 2 sets a route from the current location Ps to the destination Pe and transmits to the vehicle system 3 of the source vehicle the route information notification. Based on the route information indicated by the route information notification, the vehicle system 3, as shown in FIG. 11A, displays the route on the displayed map via the display controller 37. In the FIG. 11A, the route passes from the current location Ps to the destination Pe though the unit roads RD1, RD3, RD5, and RD6, where it is assumed that there no accuracy degraded roads.

As shown in the example of FIG. 11B, if, based on the system status notifications from the respective vehicles, the driving management center 2 determines that the unit road RD3 is an accuracy degraded road that is one of constituent unit roads forming the above route, the driving management center 2 updates contents of the degradation control table. In such a case, the driving management center 2 will set an alternative route excluding the unit road RD3 as an accuracy degraded road. The driving management center 2 transmits the route information notification to notify the vehicle system 3 of this alternative route. Upon being aware of the driver's intent to continue automated driving, the vehicle system 3, as shown in FIG. 11B, displays the alternative route as a new route on the displayed map via the display controller 37. This new route passes from the current location Ps to the destination Pe though the unit roads RD1, RD2, RD4, and RD6. The display controller 37 displays, as well as the new route, the accuracy degraded road that has caused the route change and the route immediately before the route change. In FIG. 11B, the accuracy degraded road is indicated by a shaded area. Alternatively, the accuracy degraded road may be indicated by blinking or an icon or the like. In some embodiments, either or both of the route immediately before the route change and the accuracy degraded road that has caused the route change may be displayed in accordance with a driver's instruction.

(1.5. Advantages)

As described above, the automated driving control system 1 generates a route excluding accuracy degraded roads, thereby conducting the automated driving control in accordance with the route. While the navigation system or the like emphasizes time in route setting, the automated driving control system emphasizes whether or not the driving control information can be acquired with the positioning accuracy needed for automated driving. Determination as to whether or not each unit road is an accuracy degraded road is made based not on prepared in advance and fixed information, but on information from the vehicles that have actually passed through the unit road. Therefore, the route to be used for automated driving can be set properly in accordance with actual situations that change from time to time.

Automated driving can be continued even if part of driving control information to be used for driving control is temporally unavailable. In such a case, however, robustness in automated driving may be reduced. In the present embodiment, the automated driving control system 1 is configured to exclude the accuracy degraded roads that are unit roads degraded in positioning accuracy from the driving control information, which allows the robustness in automated driving to be retained.

In the present embodiment, if at least one of the location detection flag and the white line detection flag is OFF, the positioning accuracy is determined to be degraded. Alternatively, for example, the positioning accuracy may be determined to be degraded if both the location detection flag and the white line detection flag are OFF.

2. Second Embodiment

A second embodiment will now be described. The second embodiment shares many common features with the first embodiment and therefore only differences from the first embodiment will be described in any greater detail. The same elements as in the first embodiment are assigned the same numbers and will not be described again.

In the first embodiment, the routes to be used for automated driving are generated in the driving management center 2. The second embodiment differs from the first embodiment in that the routes to be used for automated driving are generated in a vehicle system 3a.

(2.1. Overall Configuration)

An automated driving control system 1a, as shown in FIG. 12, includes a driving management center 2a and a vehicle system 3a (as an apparatus for automated driving mounted in a vehicle). The driving management center 2a and the vehicle system 3a wirelessly communicate with each other. The vehicle system 3a transmits to the driving management center 2a a system status notification to notify the driving management center 2a of a status of the vehicle system 3a. The driving management center 2a transmits to the vehicle system 3a a map data notification to notify the vehicle system 3a of map data needed to set a route. With such a configuration, the driving management center 2a can identify roads in environments suitable for automated driving, and based on the map data acquired from the driving management center 2a, the vehicle system 3a can set a route and perform automated driving control. The system status notification includes a map request flag instead of the route request flag.

(2.2. Driving Management Center)

The driving management center 2a is similar in configuration to the driving management center 2 of the first embodiment except that the driving management center 2a includes a transmit map extractor 25 in place of the route generator 24. The transmit map extractor 25 may be a well-known microcomputer including a central processing unit (CPU), a read-only memory (ROM), a random-access memory (RAM), and other components. The function of the transmit map extractor 25 may be implemented by the CPU executing computer programs stored in the ROM or the like.

The transmit map extractor 25 is configured to, upon receipt of the system status notification including the map request flag set ON from a vehicle carrying the vehicle system 3a, extract map data (including the degradation information table) needed to generate a route, based on a location and a destination of the source vehicle indicated by the system status notification, and transmit the map data to the source vehicle. The transmit map extractor 25 is further configured to, if the degradation information table is updated and at least one of the accuracy degradation flags F has changed, transmit the updated contents thereof to all the registered vehicles.

(2.3. Vehicle System)

The vehicle system 3a is similar in configuration to the vehicle system 3 of the first embodiment except that the vehicle system 3a includes a map updater 38, a local map database 39, and a route generator and storage 40, in place of the route storage 35. Each of the map updater 38 and the route generator and storage 40 may be a well-known microcomputer including a central processing unit (CPU), a read-only memory (ROM), a random-access memory (RAM), and other components. The function of each of the map updater 38 and the route generator and storage 40 may be implemented by the CPU executing computer programs stored in the ROM or the like. The local map database 39 may include any one of various readable and writable memories.

The map updater 38 is configured to, upon receipt of the map data from the driving management center 2a via the wireless communication unit 34, store the map data in the local map database 39. The map updater 38 is configured to, upon distribution of update information for the degradation information table included in the map data, update contents of the local map database 39 using the update information. That is, similar contents to some or all contents of the map database 23 in the driving management center 2a may be stored in the local map database 39.

The route generator and storage 40 is configured to perform similar route store processing to the route store processing to be performed in the route storage 35 (see FIG. 2) and route generation processing to generate a route based on the contents of the local map database 39. In step S110 of the route store processing of the present embodiment, the route generator and storage 40 determines whether or not route information has been generated in the route generation processing.

(2.4. Route Generation Processing)

Figure 13:
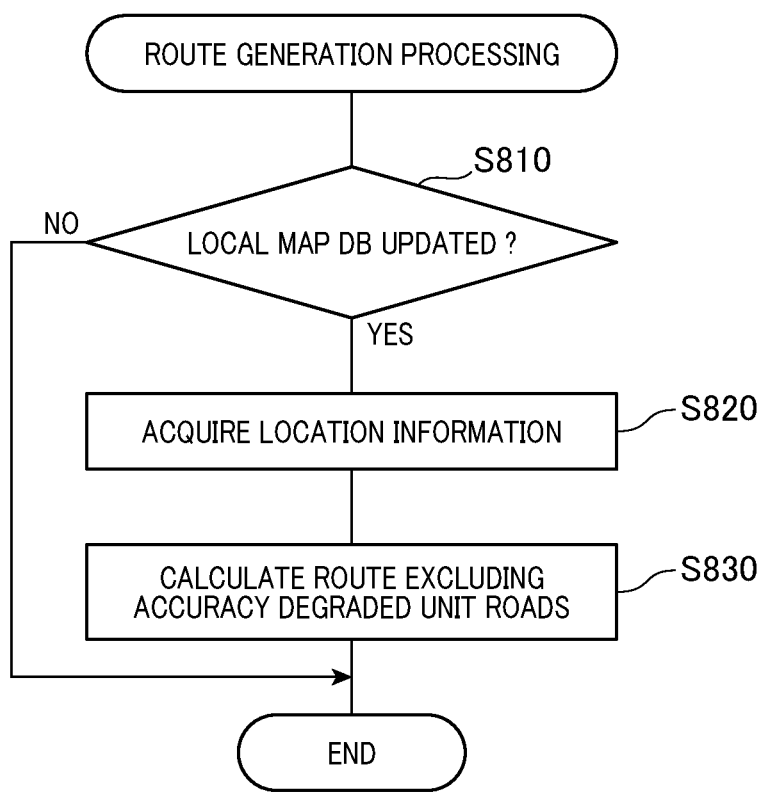
FIG. 13 is a flowchart of route generation processing to be performed in a vehicle system of the second embodiment.

The route generation processing will now be described with reference to a flowchart of FIG. 13. The route generation processing is launched repeatedly every time an instruction to start automated driving and a destination are entered via an input means (not shown). Where the system status notification including the map request flag set ON is transmitted to the driving management center 2a via the wireless communication unit 34.

First in step S810, the route generator and storage 40 receives route information notification including map data including the degradation information table or update data for the degradation information table from the driving management center 2a via the wireless communication unit 34, and determines whether or not the local map database 39 has been updated. The wireless communication unit 34, the map updater 38, the local map database 39 serves as a degradation information acquirer.

If in step S810 it is determined that the local map database 39 has not been updated, then the route generator and storage 40 repeats step S810. If in step S810 it is determined that the local map database 39 has been updated, the process flow proceeds to step S820. In step S820, the route generator and storage 40 acquires location information of the own vehicle from the acquired information processor 32.

In step S830, in accordance with the location information acquired in step S820 and the destination entered in advance, the route generator and storage 40 looks up the degradation information table stored in the local map database 39 and generate route information by calculating a route excluding accuracy degraded roads that are unit roads associated with the unit road identifiers RIDs for which the accuracy degradation flags F are ON. Thereafter, the process flow ends. The route information, as in the route information notification of the first embodiment, may include, as well as the calculated route, information indicating that route calculation is impossible and information about accuracy degraded roads.

(2.5. Advantages)

In the automated driving control system 1a, not the driving management center, but the vehicle system is responsible for route generation. The automated driving control system 1a can provide similar advantages to those of the automated driving control system 1 in the first embodiment. Further, in the automated driving control system 1a, processing load of the driving management center 2a can be reduced.

3. Third Embodiment

A third embodiment will now be described. The third embodiment shares many common features with the first embodiment and therefore only differences from the first embodiment will be described in any greater detail. The same elements as in the first embodiment are assigned the same numbers and will not be described again.

In the first embodiment, a single accuracy degradation flag F is provided for each of the unit roads identified by the unit road identifiers RID. The third embodiment is similar to the first embodiment except that a single accuracy degradation flag F is provided for each combination of one of levels of sensors of the vehicle system and one of time-slots.

(3.1. Overall Configuration)

Figure 14:
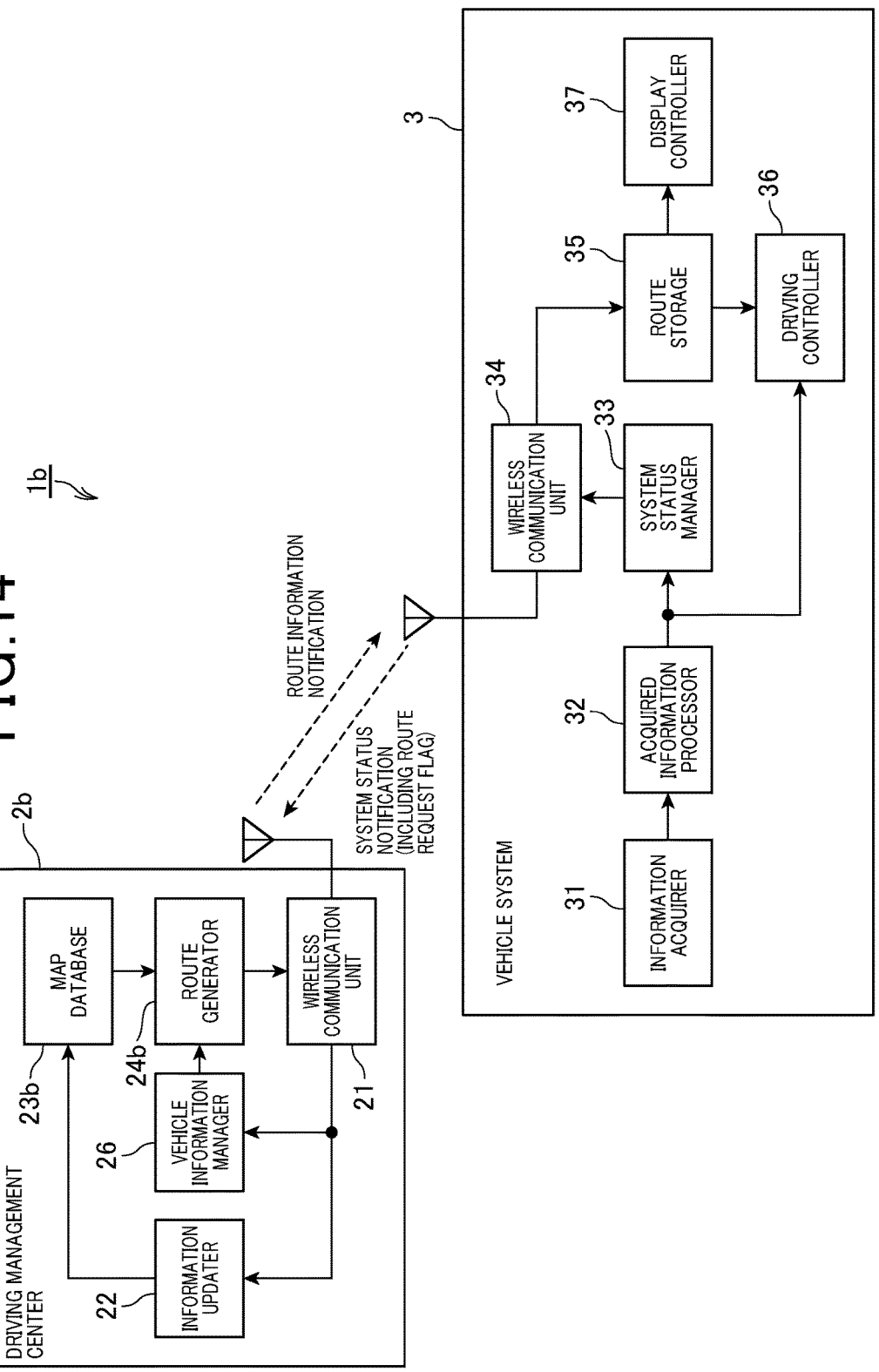
FIG. 14 is a block diagram of an automated driving control system in accordance with a third embodiment.

An automated driving control system 1b shown in FIG. 14 includes a driving management center 2b and the vehicle system 3. The driving management center 2b and the vehicle system 3 wirelessly communicate with each other. As in the first embodiment, the vehicle system 3 transmits to the driving management center 2b the system status notification to notify the driving management center 2b of a status of the vehicle system 3. The driving management center 2b transmits to the vehicle system 3 a route information notification to notify a route be used for automated driving.

The vehicle system 3 is similar in configuration to that of the first embodiment except that the system status notification to be transmitted to the driving management center 2b further includes information indicative of sensor levels of various sensors to be used for gathering the driving control information. The sensor levels are indicative of sensing capabilities of the sensors evaluated in plural steps using a unified index between the vehicles.

(3.2. Driving Management Center)

The driving management center 2b includes the wireless communication unit 21, an information updater 22b, a map database 23b, a route generator 24b, and a vehicle information manager 26.

Each of the information updater 22b, the route generator 24b, and the vehicle information manager 26 may be a well-known microcomputer including a central processing unit (CPU), a read-only memory (ROM), a random-access memory (RAM), and other components. The function of each of the information updater 22b, the route generator 24b, and the vehicle information manager 26 may be implemented by the CPU executing computer programs stored in the ROM or the like.

The map database 23b is different in configuration of the degradation information table from the map database 23 of the first embodiment as shown in FIG. 4. More specifically, as shown in FIG. 15, the accuracy degradation flag F is stored in the in degradation information table for each combination of one of unit road identifiers RIF and one of sensor levels LV of, e.g., the satellite positioning system (GNSS) receiver, and one of time-slots TW. Although not shown in FIG. 15, fields for storing the first number of vehicles Ncar and the second number of vehicles Ninf, as in the degradation information table of FIG. 4, are provided for each accuracy degradation flag F. Although not shown in FIG. 15, the accuracy degradation flag F is stored in the degradation information table for each combination of one of unit road identifiers RIF and one of sensor levels LV of one of plural sensors (including the satellite positioning system (GNSS) receiver) and one of time-slots TW.

The vehicle information manager 26, as shown in FIG. 16, includes a vehicle information table associating each vehicle ID with sensor levels LV of the sensors mounted in the vehicle identified by the vehicle ID and used to gather the driving control information. The vehicle information table is generated and updated based on contents of the system status notification from the vehicle system 3. Alternatively, the vehicle information table may be pre-generated using information provided by a vehicle manufacturer or the like. In the present embodiment, the sensors include a satellite positioning system (GNSS) receiver, a camera used to detect white lines, and a Lidar used to detect surrounding targets. The sensor level of each sensor is evaluated in three steps, where a larger sensor level value corresponds to a higher capability or sensitivity.

The information updater 22b is configured to perform degradation determination information gathering processing and accuracy degradation flag determination processing.

Figure 17:
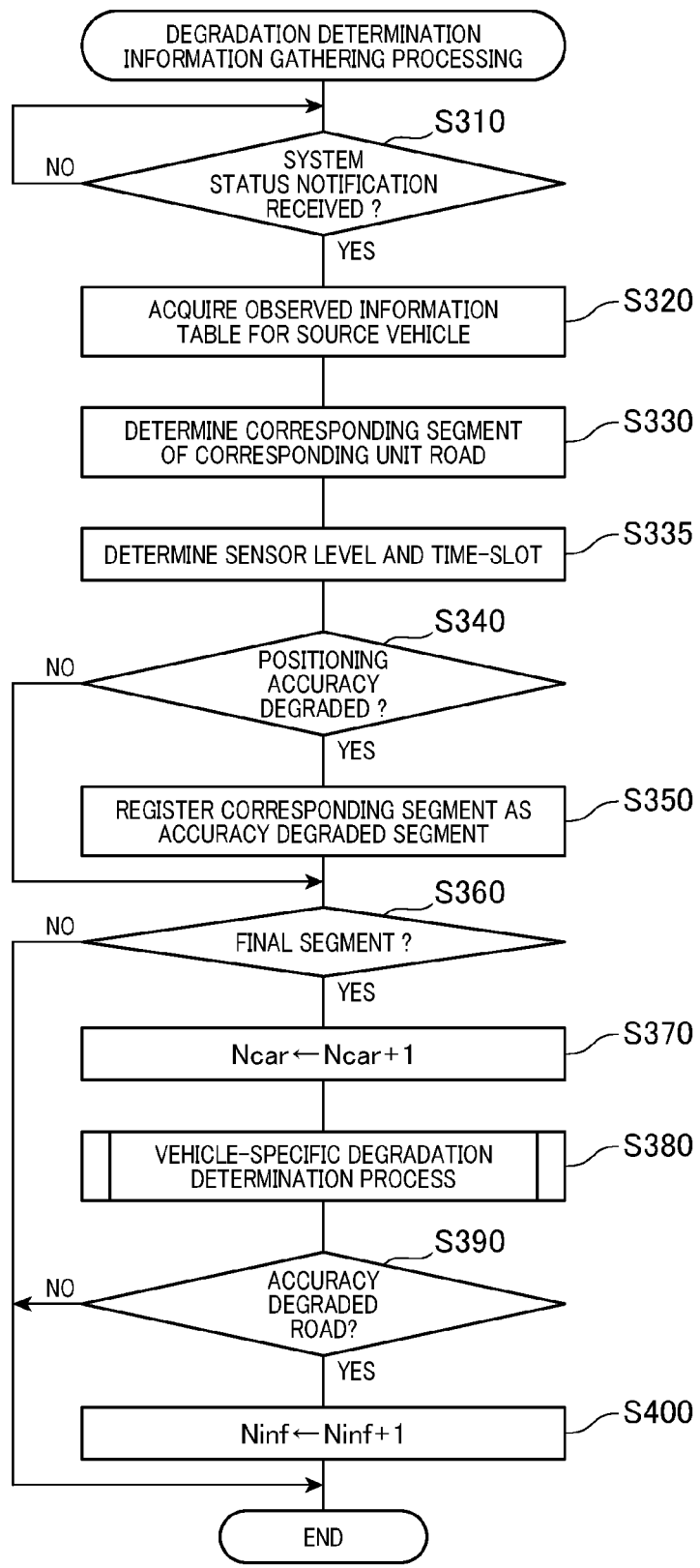
FIG. 17 is a flowchart of degradation determination information gathering processing to be performed in an information updater of the third embodiment.

The degradation determination information gathering processing of the present embodiment is similar to that of the first embodiment except that the degradation determination information gathering processing, as shown in FIG. 17, includes step S335 inserted between step S330 and step S340. In step S335, based on the information of the system status notification, the information updater 22b determines the sensor level LV and the current time-slot TW, and in steps S340-S400, processes information stored in the degradation information table identified by the unit road RID, the sensor level LV, and the time-slot TW determined in steps S330 and S335.

Figure 18:
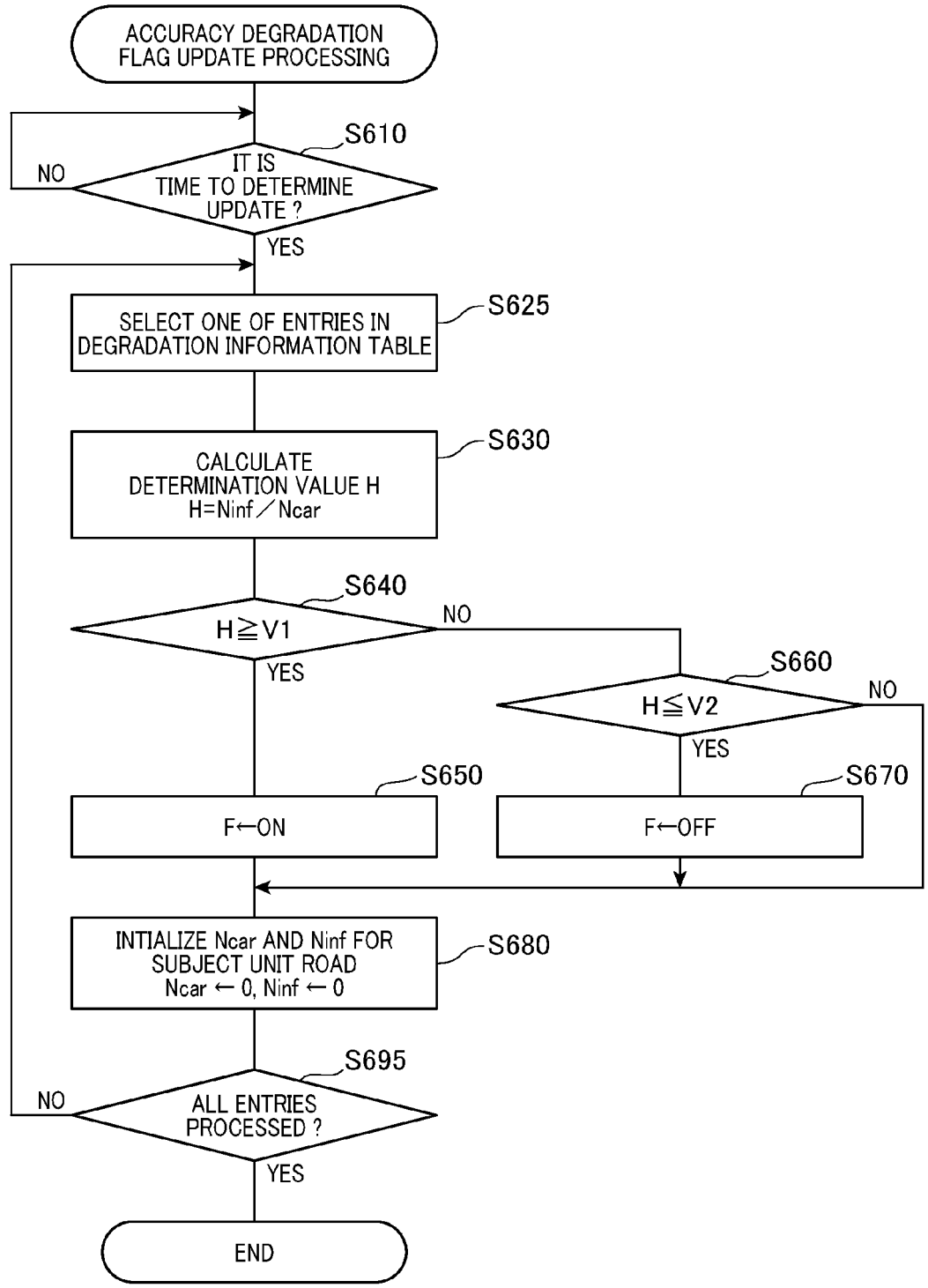
FIG. 18 is a flowchart of accuracy degradation flag update processing to be performed in the information updater of the third embodiment.

The accuracy degradation flag determination processing of the present embodiment is similar to that of the first embodiment except that the accuracy degradation flag determination process of the present embodiment, as shown in FIG. 18, includes steps S625 and S695 respectively in place of steps S620 and S690. In step S625, the information updater 22b selects one of entries in the degradation information table based on the unit road identifier RID, the sensor level LV, and the time-slot TW. In step S695, the information updater 22b determines whether or not all of the entries in the degradation information table have processed. If the above steps S625-S680 have not been performed for at least one of all of the entries in the degradation information table, the process flow returns to step S625. If the above steps S625-S680 have been performed for all of the entries, the process flow ends.

The route generator 24b is configured to perform the route generation processing. The route generation processing of the present embodiment is similar to that of the first embodiment as shown in FIG. 9 except that a way to extract the accuracy degraded road from the degradation information table varies. More specifically, the route generator 24 of the first embodiment determines the unit roads associated with the unit road identifiers RIDs for which the accuracy degradation flags F are ON to be accuracy degraded roads using the degradation information table as shown in FIG. 4. In the present embodiment, the route generator 24b uses the vehicle information table as shown in FIG. 16 to extract sensor levels associated with the vehicle ID of the vehicle for which the route is to be generated and determines the time-slot Tw from the current time. Using the degradation information table as shown in FIG. 15, the route generator 24b extracts the accuracy degradation flags F corresponding to the sensor level LV and the time-slot TW, thereby determining the unit road identified by the unit road identifier RID and having at least of the accuracy degradation flags F set ON to be the accuracy degraded road.

(3.3. Advantages)

With the automated driving control system 1b configured as above, the accuracy degraded roads can be extracted properly in response to sensor levels of sensors mounted in the vehicle and the time-slots Tw, and thus a route suitable for automated driving can be generated, which allows robustness of automated driving to be increased.

4. Fourth Embodiment

A fourth embodiment will now be described. The fourth embodiment shares many common features with the first embodiment and therefore only differences from the first embodiment will be described in any greater detail. The same elements as in the first embodiment are assigned the same numbers and will not be described again.

In the first embodiment, the route to be used for automated driving is generated in driving management center 2. In the fourth embodiment, as in the second embodiment, the route to be used for automated driving is generated in the vehicle system 3a (as an apparatus for automated driving mounted in a vehicle).

In the first embodiment, a single accuracy degradation flag F is provided for each of the unit roads identified by the unit road identifiers RID. The forth embodiment, as in the third embodiment, is different from the first embodiment in that a single accuracy degradation flag F is associated with each combination of one of levels of sensors of the vehicle system and one of time-slots. That is, the fourth embodiment can be regarded as a combination of features of the second and third embodiments.

(4.1. Overall Configuration)

An automated driving control system 1c, as shown in FIG. 19, includes a driving management center 2c and a vehicle system 3a. The driving management center 2c and the vehicle system 3a wirelessly communicate with each other. The vehicle system 3a transmits to the driving management center 2c the system status notification to notify the driving management center 2 of a status of the vehicle system 3. The driving management center 2c transmits to the vehicle system 3a map data needed to set a route. With such a configuration, the driving management center 2c can identify roads in environments suitable for automated driving. The vehicle system 3a can set the route and perform automated driving control according to the map data acquired from the driving management center 2a. The system status notification includes the map request flag in place of the route request flag.

The vehicle system 3a is similar in configuration to that of the second embodiment except that the system status notification to be transmitted to the driving management center 2c, as in the third embodiment, further includes information indicative of sensor levels of various sensors to be used for gathering the driving control information.

The driving management center 2c is similar in configuration to the driving management center 2b of the third embodiment except that the driving management center 2c includes a transmit map extractor 25b in place of the route generator 24b. The transmit map extractor 25b may be a well-known microcomputer including a central processing unit (CPU), a read-only memory (ROM), a random-access memory (RAM), and other components. The function of the transmit map extractor 25b may be implemented by the CPU executing computer programs stored in the ROM or the like.

The transmit map extractor 25b is configured to, upon receipt of the system status notification including the route request flag set ON from the vehicle carrying the vehicle system 3a, extract map data needed to generate the route based on location information and a destination of the source vehicle indicated by the system status notification and transmit the map data to the source vehicle. Information about the accuracy degraded roads extracted from the vehicle information table and the degradation information table based on the vehicle ID of the source vehicle and the current time is used in place of the degradation information table. In addition, upon a change in information about the accuracy degraded roads caused by update of the degradation information table, the driving management center 2c transmits the updated contents to all the vehicles registered as vehicles that are automatically traveling.

(4.2. Advantages)

The automated driving control system 1c configured as above can provide similar advantages to those of any one of first to third embodiments.

(5. Modifications)

Specific embodiments of the present invention have so far been described. However, the present invention should not be construed as being limited to the foregoing embodiments, but may be modified in various modes.

(1) In the above embodiments, the driving control information generated in the acquired information processor 32 is used as the observed information. Alternatively, the observed information may further include a communication quality of the wireless communication unit 34.

(2) In the second and third embodiments, the sensor levels LV and the time-slots TW are used as additional conditions to determine the presence of accuracy degradation. Alternatively, information correlated with a change in traveling environment, such as weather, temperature, event dates or the like may be used as additional conditions to determine the presence of accuracy degradation.

(3) The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

(4) It should be appreciated that the invention is not to be limited to the automated driving control system corresponding to the automated driving control apparatus and that the present invention can be implemented in numerous ways, including as the vehicle system corresponding to the vehicle-mounted apparatus for automated driving, a program for enabling a computer to function as the driving management center, and a non-transitory computer readable storage medium storing such a program.

What is claimed is:

1. An automated driving control apparatus comprising:
an information acquirer mounted in each of a plurality of vehicles, the information acquirer being configured to acquire driving control information needed to control automated driving of the vehicle;
a degradation information storage configured to store information about roads having degraded accuracy, which are roads on which the accuracy of the driving control information acquired from the plurality of vehicles is degraded to below a predetermined required level;

an information updater configured to acquire observed information concerning the information acquirer mounted in each of the plurality of vehicles, and using the observed information, update stored contents of the degradation information storage;

a route generator configured to generate a route excluding the roads having degraded accuracy stored in the degradation information storage; and a driving controller mounted in each of the plurality of vehicles, the driving controller being configured to conduct automated driving control of the vehicle according to the route generated by the route generator and the driving control information acquired by the information acquirer of the vehicle, wherein the degradation information storage, the information updater, and the route generator form a driving management center configured to manage automated driving of each of the plurality of vehicles within a predefined area, and the information acquirer and the driving controller mounted in a respective one of the plurality of vehicles form an apparatus for automated driving of the vehicle, and the apparatus for automated driving mounted in a respective one of the plurality of vehicles is configured to wirelessly communicate with the driving management center and thereby acquire the route generated by the route generator.

2. The apparatus of claim 1, wherein the driving control information acquired by the information acquirer mounted in each of the plurality of vehicles includes at least information indicative of a location and a traveling environment of the vehicle.

3. The apparatus of claim 1, wherein
the degradation information storage is configured to store information as to whether or not each of unit roads that are roads corresponding to respective links forming map data is the accuracy degraded road, and the information updater is configured to, for each of the unit roads, determine, for each of segments of the unit road, whether or not the accuracy of the driving control information is degraded on the segment, and based on the determination results for the respective segments of the unit road, determine whether or not the unit road is the accuracy degraded road, thereby update the stored contents of the degradation information storage based on the determination result for the unit road.

4. The apparatus of claim 3, wherein the information updater is configured to, for each of the unit roads, if a ratio of a number of segments of the unit road, on which the accuracy of the driving control information is determined to be degraded, to the total number of segments of the unit road is equal to or greater than a predetermined threshold, then determine that the unit road is the accuracy degraded road.

5. The apparatus of claim 3, wherein the information updater is configured to, for each of the unit roads, if a ratio of a number of consecutive segments of the unit road, on which the accuracy of the driving control information is determined to be degraded, to the total number of segments of the unit road is equal to or greater than a predetermined threshold, then determine that the unit road is the accuracy degraded road.

6. The apparatus of claim 1, wherein the degradation information storage is configured to store the information about the roads having degraded accuracy for each of sensing levels of respective sensing devices forming the information acquirer.

7. The apparatus of claim 1, wherein the degradation information storage is configured to store the information about the roads having degraded accuracy for each of types of information correlated with a change in traveling environment of the vehicle.

8. The apparatus of claim 7, wherein the types of information correlated with a change in traveling environment of each of the plurality of vehicles comprise time-slots.

9. The apparatus of claim 1, wherein the driving management center is configured to wirelessly communicate with the apparatus for automated driving mounted in each of the plurality of vehicles and thereby acquire the driving control information acquired by the information acquirer of the vehicle as observed information.

10. The apparatus of claim 1, wherein the information acquirer of each of the plurality of vehicles is configured to wirelessly communicate with the driving management center via a wireless communication unit mounted in the vehicle.

11. The automated driving control apparatus according to claim 1
wherein the information updater configured to acquire observed information concerning the information acquirer, and using the observed information, update in near real time stored contents of the degradation information storage.

12. An automated driving control apparatus comprising:
an information acquirer mounted in each of a plurality of vehicles, the information acquirer being configured to acquire driving control information needed to control automated driving of the vehicle;

a degradation information storage configured to store information about roads having degraded accuracy, which are roads on which the accuracy of the driving control information acquired from the plurality of vehicles is degraded to below a predetermined required level;

an information updater configured to acquire observed information concerning the information acquirer mounted in each of the plurality of vehicles, and using the observed information, update stored contents of the degradation information storage;

a route generator configured to generate a route excluding the roads having degraded accuracy stored in the degradation information storage; and a driving controller mounted in each of the plurality of vehicles, the driving controller being configured to conduct automated driving control of the vehicle according to the route generated by the route generator and the driving control information acquired by the information acquirer of the vehicle, wherein the degradation information storage and the information updater form a driving management center configured to manage automated driving of each of the plurality of vehicles within a predefined area, and the information acquirer, the route generator, and the driving controller mounted in a respective one of the plurality of vehicles form an apparatus for automated driving of the vehicle, and the apparatus for automated driving of a respective one of the plurality of vehicles is configured to wirelessly communicate with the driving management center and thereby acquire the information about the roads having degraded accuracy stored in the degradation information storage.

13. The apparatus of claim 12, wherein the driving management center is configured to wirelessly communicate with the apparatus for automated driving mounted in each of the plurality of vehicles and thereby acquire the driving control information acquired by the information acquirer of the vehicle as observed information.

14. The apparatus of claim 12, wherein the information acquirer mounted in a respective one of the plurality of vehicles is configured to wirelessly communicate with the driving management center via a wireless communication unit mounted in the vehicle.

\* \* \* \* \*